(12) United States Patent
Janssens et al.

(10) Patent No.: US 11,682,297 B2
(45) Date of Patent: Jun. 20, 2023

(54) REAL-TIME SCENE MAPPING TO GPS COORDINATES IN TRAFFIC SENSING OR MONITORING SYSTEMS AND METHODS

(71) Applicant: FLIR Systems Trading Belgium BVBA, Meer (BE)

(72) Inventors: Koen Janssens, Aaigem (BE); Tom Van Severen, Marke (BE)

(73) Assignee: FLIR Systems Trading Belgium BVBA, Meer (BE)

(*) Notice: Subject to any disclaimer, the term of this patent is extended or adjusted under 35 U.S.C. 154(b) by 38 days.

(21) Appl. No.: 17/214,769

(22) Filed: Mar. 26, 2021

(65) Prior Publication Data

US 2021/0303871 A1 Sep. 30, 2021

Related U.S. Application Data

(60) Provisional application No. 63/003,176, filed on Mar. 31, 2020.

(51) Int. Cl.

| | |
|---|---|
| *G08G 1/052* | (2006.01) |
| *G06T 7/70* | (2017.01) |
| *G08G 1/017* | (2006.01) |
| *G08G 1/04* | (2006.01) |
| *H04N 7/18* | (2006.01) |
| *G06V 20/54* | (2022.01) |
| *G06F 18/21* | (2023.01) |
| *G06F 18/2415* | (2023.01) |

(Continued)

(52) U.S. Cl.
CPC ......... *G08G 1/052* (2013.01); *G06F 18/2193* (2023.01); *G06F 18/2415* (2023.01); *G06T 7/70* (2017.01); *G06V 10/764* (2022.01); *G06V 10/82* (2022.01); *G06V 20/54* (2022.01); *G08G 1/017* (2013.01); *G08G 1/04* (2013.01); *H04N 7/183* (2013.01); *G06T 2207/10048* (2013.01); *G06T 2207/20084* (2013.01); *G06T 2207/30236* (2013.01)

(58) Field of Classification Search
None
See application file for complete search history.

(56) References Cited

U.S. PATENT DOCUMENTS

| | | | |
|---|---|---|---|
| 5,908,464 A | 6/1999 | Kishigami et al. | |
| 6,236,933 B1 | 5/2001 | Lang | |

(Continued)

FOREIGN PATENT DOCUMENTS

WO WO 20108/104563 A2 6/2018

*Primary Examiner* — Delomia L Gilliard
(74) *Attorney, Agent, or Firm* — Haynes and Boone, LLP

(57) ABSTRACT

Systems and methods for tracking objects though a traffic control system include an image sensor configured to capture a stream of images of scene from an associated real-world position, an object tracker configured to identify an object in the captured images and define an associated object location in the captured images, a three-dimensional stage model system configured to transform the associated object location in the image to three-dimensional coordinates associated with the image sensor, and a three-dimensional world model configured to transform identified objects to real-world coordinates. Embodiments use lens aberration, sensor mounting height and location, accelerometer, gyro-compass and/or global position satellite information to generate a situational map.

20 Claims, 7 Drawing Sheets

(51) Int. Cl.
*G06V 10/764* (2022.01)
*G06V 10/82* (2022.01)

(56) References Cited

U.S. PATENT DOCUMENTS

| | | |
|---|---|---|
| 6,401,027 B1 | 6/2002 | Xu et al. |
| 8,041,503 B2 | 10/2011 | Choi et al. |
| 8,368,762 B1 * | 2/2013 | Chen .................... H04N 17/002 348/188 |
| 8,660,782 B2 | 2/2014 | Vang et al. |
| 2013/0100249 A1 * | 4/2013 | Norita .................. G01B 11/245 348/46 |
| 2013/0300828 A1 * | 11/2013 | Yamato ................ H04N 13/128 348/44 |
| 2018/0213218 A1 * | 7/2018 | Yu .......................... G06V 10/10 |
| 2018/0293445 A1 * | 10/2018 | Gao ...................... B60W 30/09 |

\* cited by examiner

REAL-TIME SCENE MAPPING TO GPS COORDINATES IN TRAFFIC SENSING OR MONITORING SYSTEMS AND METHODS

CROSS-REFERENCE TO RELATED APPLICATIONS

This application claims the benefit of and priority to U.S. Provisional Patent Application No. 63/003,176 filed Mar. 31, 2020 and entitled "REAL-TIME SCENE MAPPING TO GPS COORDINATES IN TRAFFIC SENSING OR MONITORING SYSTEMS AND METHODS," which is incorporated herein by reference in its entirety.

TECHNICAL FIELD

The present application relates generally to traffic infrastructure systems and, more particularly for example, to traffic sensing and/or monitoring systems and methods for mapping a scene in real-time to global positioning satellite (GPA) coordinates.

BACKGROUND

Traffic control systems use sensors to detect vehicles and traffic to help mitigate congestion and improve safety. These sensors range in capabilities from the ability to simply detect vehicles in closed systems (e.g., provide a simple contact closure to a traffic controller) to those that are able to classify (e.g., distinguish between bikes, cars, trucks, etc.) and monitor the flows of vehicles and other objects (e.g., pedestrians, animals).

Within a traffic control system, a traffic signal controller may be used to manipulate the various phases of traffic signal at an intersection and/or along a roadway to affect traffic signalization. These traffic control systems are typically positioned adjacent to the intersection/roadway they control (e.g., disposed upon a traffic signal pole). Traffic control systems generally comprise an enclosure constructed from metal or plastic to house electronic equipment such as a sensor (e.g., an infrared imaging camera or other device), communications components and control components to provide instructions to traffic signals or other traffic control/monitoring devices.

The operation of the traffic signal may be adaptive, responsive, pre-timed, fully-actuated, or semi-actuated depending upon the hardware available at the intersection and the amount of automation desired by the operator (e.g., a municipality). For instance, cameras, loop detectors, or radar may be used to detect the presence, location and/or movement of one or more vehicles. For example, video tracking methods may be used to identify and track objects that are visible in a series of captured images. In response to a vehicle being detected, a traffic signal controller may alter the timing of the traffic signal cycle, for example, to shorten a red light to allow a waiting vehicle to traverse the intersection without waiting for a full phase to elapse or to extend a green phase if it determines an above-average volume of traffic is present and the queue needs additional time to clear.

One drawback of conventional systems is that the systems are limited to tracking objects from a point of view of a sensor and/or tracking system. With the potential for multiple systems to interact (e.g., local traffic monitoring system, vehicle navigation system, etc.), the different data produced by these different systems may not be compatible for use in real-time applications across systems and devices.

In view of the foregoing, there is a continued need for improved traffic control systems and methods that more accurately detect and monitor traffic in real-time applications.

SUMMARY

Improved traffic infrastructure systems and methods are disclosed herein. In various embodiments, a traffic system monitors a traffic scene and is configured to automatically detect and track objects in the traffic scene. The traffic system may include one or more sensors (e.g., an optical image sensor or an infrared image sensor) configured to capture images of the traffic scene. The detected/tracked objects may include vehicles, trucks, pedestrians, cyclists, and/or other objects of interest. The traffic sensor is configured to automatically map the objects and activity in the scene to real world using GPS coordinates. This information can be visualized on a situational map for easier remote traffic monitoring providing an easier interpretation and enhanced customer experience. This also eliminates an extra conversion step by the customer to translate the real situation to the traffic sensors point of view.

The scope of the present disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

The present disclosure illustrates traffic infrastructure systems and methods with improved object detection and tracking. In various embodiments, a traffic monitoring system includes an image capture component configured with an image sensor (e.g., a visual image sensor and/or a thermal image sensor) to capture video or images of a traffic scene. The traffic monitoring system may include an integrated system that also includes a GPS sensor, an accelerometer and on-board object tracking module. The traffic monitoring systems of the present disclosure enhance the customer experience by providing an easier to configure system based on real-world coordinates. In some embodiments, the infrastructure blueprint and map situation of the remote system is automatically translated to the camera system independent from camera view. The present disclosure enhances the feedback to the user from the on-board object detection module by mapping the real-time traffic on a situational map.

In various embodiments, a two-dimensional (2D) camera image is captured of a traffic scene and objects are detected in the captured image. The detected objects are classified and tracked based on the appearance of each object in the scene. The traffic monitoring system may include a calibrated camera with known position and location (e.g., camera mounting height) and an integrated three-axis accelerometer. The integrated camera platform may be configured to calculate distances and locations of detected objects relative to the camera location and point of view, creating a 3D stage model. The traffic monitoring system is further aware of its location in the real world based on the integrated GPS receiver, and its point of view in the real world based on a gyro-compass. Using this information, the present disclosure allows for the mapping of detected objects from the 3D stage model to the 3D real world.

The present disclosure provides many advantages to users of traffic monitoring systems. For example, by representing the traffic in the 3D real world it makes it possible for the user to configure the camera and its applications (e.g., vehicle detection, cyclist detection, pedestrian detection, etc.) based on the infrastructure blueprint and map situation. A customer can, for example, indicate that he wants to detect cyclists from 100 meters away from the stop bar at an intersection. There is no extra interpretation needed by the user because the output of the embedded traffic camera system is presented in the same format as the infrastructure blueprint, independent from the camera view. The present disclosure also enhances the feedback to the user from the on-board object detection by mapping the real-time traffic on a situational map.

Figure 1:
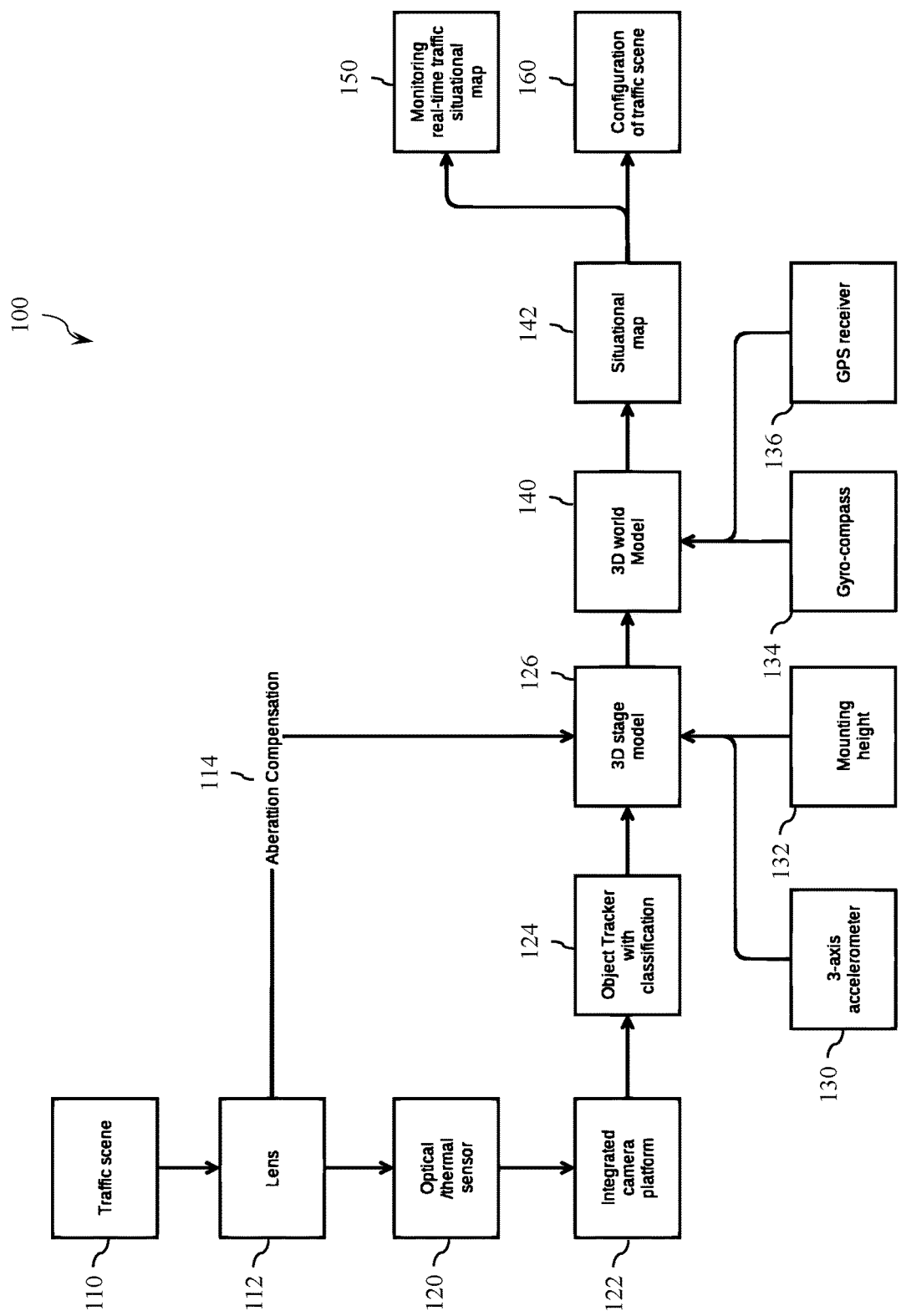
FIG. 1 is a block diagram illustrating a process flow for tracking and scene mapping, in accordance with one or more embodiments.

Embodiments of the present disclosure will now be discussed with reference to the figures. FIG. 1 is a block diagram illustrating a process flow for tracking and scene mapping, in accordance with one or more embodiments. The process may be performed by one or more components of a traffic sensor, imaging device, traffic monitoring device, or other devices or systems associated with a traffic monitoring system.

The traffic monitoring system 100 is configured to monitor a traffic scene 110, which is imaged by an image sensor 120 through optical components, such as one or more lenses 112. The image sensor 120 may include a visible light sensor, thermal sensor, infrared sensor, or other imaging sensor. The lenses 112 have aberration properties that cause light from the traffic scene 110 to be distorted or blurred. The aberration properties are stored by the system 100 as aberration compensation data 114. The image sensor 120 may be part of a camera or other device that includes an integrated camera platform 122 configured to provide real-time image processing in accordance with one or more embodiments described herein.

In various embodiments, the capture images of the traffic scene 110 are processed through an object tracker module 124 that provides object detection, tracking and classification. The object tracker module 124 may be implemented using image processing, machine learning (e.g., a convolutional neural network) and/or other techniques. Information about tracked objects is used to generate a 3D stage model 126 that describes the size and/or location of each tracked object in a 3D stage modeled from a known location (e.g., from the point of view of the camera). In the illustrated embodiment, camera properties including aberration compensation data 114, data from a 3-axis accelerometer 130, camera mounting height 132, and/or other available information regarding the camera and/or traffic scene.

The 3D stage model 126 is then translated to a 3D real-world model 140, using location and/or orientation information such as information from a gyro-compass 134 and GPS location from a GPS receiver 136. The 3D real-world model 140 may then be used to generate a situational map 142 configured for a desired use, such as to generate a map of all or part of the traffic scene for a user. The situational map 142 may be used, for example, to present a real-time traffic situational map 150 and/or display a configuration of a traffic scene 160.

Figure 2:
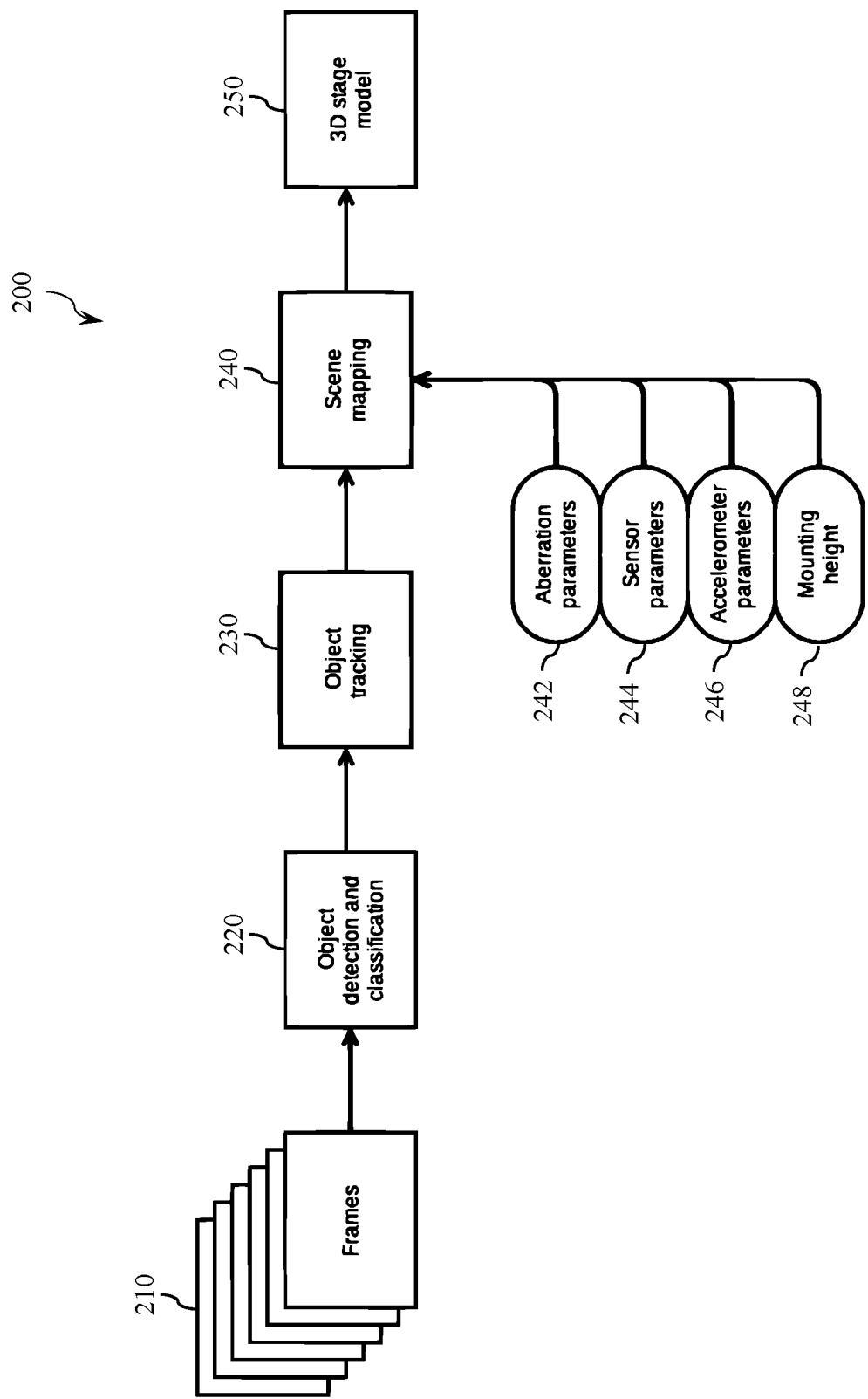
FIG. 2 is a block diagram illustrating a process for generating a 3D Stage model, in accordance with one or more embodiments.

Referring to FIG. 2, the creation of the 3D Stage model will now be described in further detail, in accordance with one or more embodiments. A process for generating a 3D stage model 200 begins with the captured image frames 210 from an image sensor configured and posited to capture images of a traffic scene. The image frames 210 are provided to object detection and classification components 220, which may include image processing, object detection, machine learning and/or other processes to detection and classify objects in the image frames 210. The detected objects are tracked by object tracking components 230, which may be configured to track the objects through the image frames 210. The object information, including object classification, position, orientation and movement through the image frame, are used to create a map of the scene using scene mapping components 240. The scene mapping components 240 are configured to build the scene map using known parameters such as lens aberration parameters 242 to compensate for distortion, blurring and/or other optical aberrations, sensor parameters 244 regarding the image sensor that captured the image frames, accelerometer parameters 246 from an accelerometer sensor, camera mounting height 248, and/or other available parameters useful for defining the scene. The scene mapping components 240 provide object tracking, system information and environmental information to 3D stage model components 250 which are configured to generate a 3D stage model of the traffic scene, for example from the point of view of the image capture device.

Figure 3:
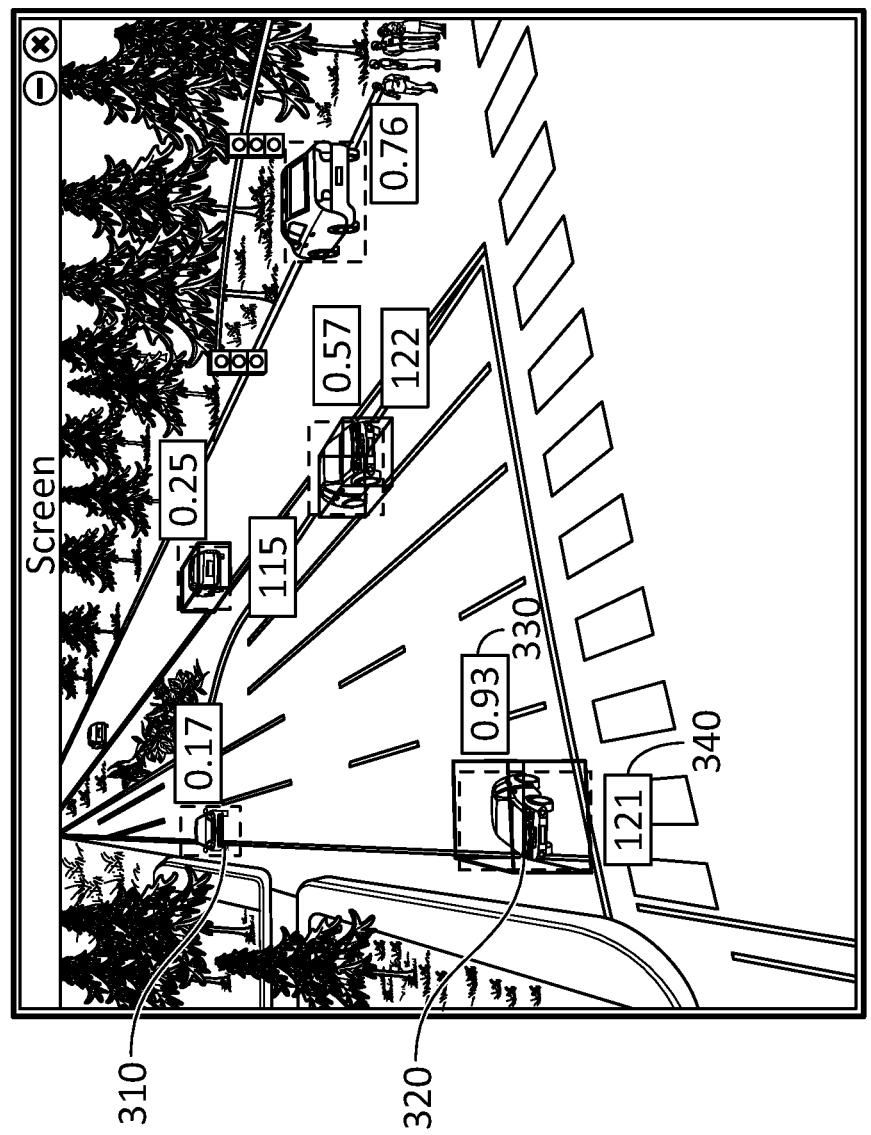
FIG. 3 illustrates an example 2D thermal camera image of a traffic scene, including detected objects denoted with bounding boxes, in accordance with one or more embodiments.

Embodiments of object tracking and scene mapping will be described in further detail with respect to the example images of FIGS. 3-4. FIG. 3 illustrates an example 2D thermal camera image 300 of a traffic scene, including identified objects and denoted with bounding boxes. In some embodiments, the detected objects are localized in the image using an object detection method (e.g., deep learning). This is represented in the 2D thermal camera image 300 by the bounding boxes, indicates as rectangles 310. The boxes may take different visual forms (e.g., colors, line styles) to indicate the class of the object, in this case vehicles. The system may also estimate the dimensions or volume of the detected objects, such as indicated by the 3D bounding boxes 320. Other information may also be provided such as a confidence factor 330 and object identifier 340.

By using the camera parameters (lens and sensor information, accelerometer and mounting height), the relative distance and location to the camera of each object can be calculated. A reference point may be used to calculate the relative distance which, for example, may be a point on the ground close to the front or back of the vehicle. This result is represented in the example 3D stage model illustrated in FIG. 4, which illustrates a top-down view of a 3D stage model 400. Based on tracking information by combining consecutive frames, information about object behavior is known to the system. For example, the system can estimate the heading of an object, and by combining that information with the object class, the system can determine the orientation and ground plane of the object. The class information may be used to help estimate the dimensions of the object.

Figure 4:
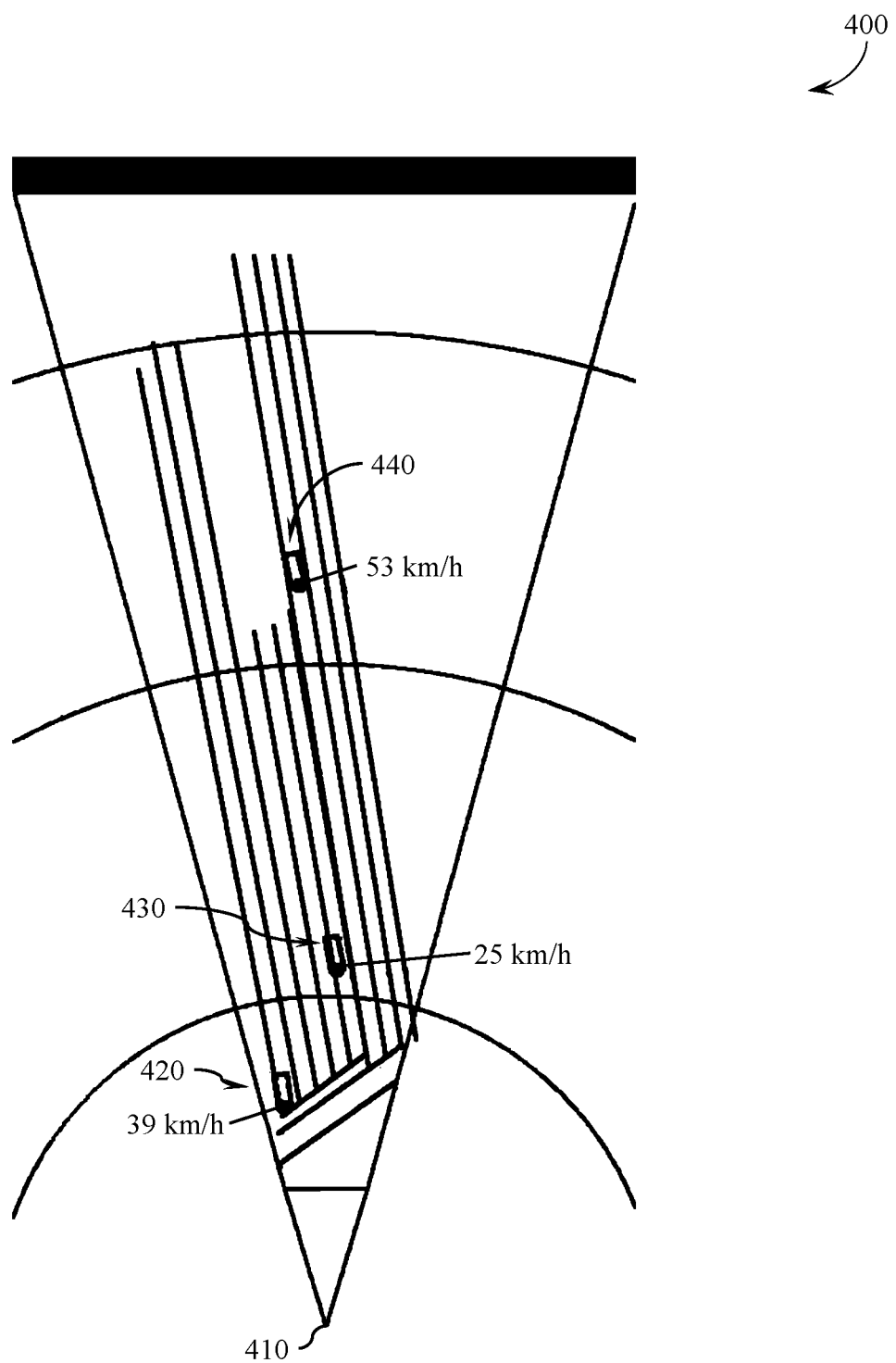
FIG. 4 illustrates an example 3D stage model, in accordance with one or more embodiments.

As illustrated in FIG. 4, the 3D stage model 400 shows a view of a scene from the perspective of a camera 410 and includes objects being tracked, such as object 420, object 430 and object 440. The 3D stage model 400 shows object location (e.g., with respect to the imaging device), object dimensions (e.g., based on the size of the object in the 3D stage model 400), object orientation/heading (e.g., an indication on the object graphic, such as an indication of the front of a vehicle), an object speed (e.g., numbers associated with each object—39 km/h, 25 km/h, 53 km/h, etc.), and other desired scene information. Objects that have been successfully tracked in consecutive frames can be visualized on the original 2D thermal image (e.g., as shown in FIG. 3) to show the estimated size and orientation in the original image, which is represented by the 3D bounding box. In some embodiments, the 3D bounding boxes are further distinguishable from the 2D bounding boxes by color, line style, or other indicia.

Figure 5:
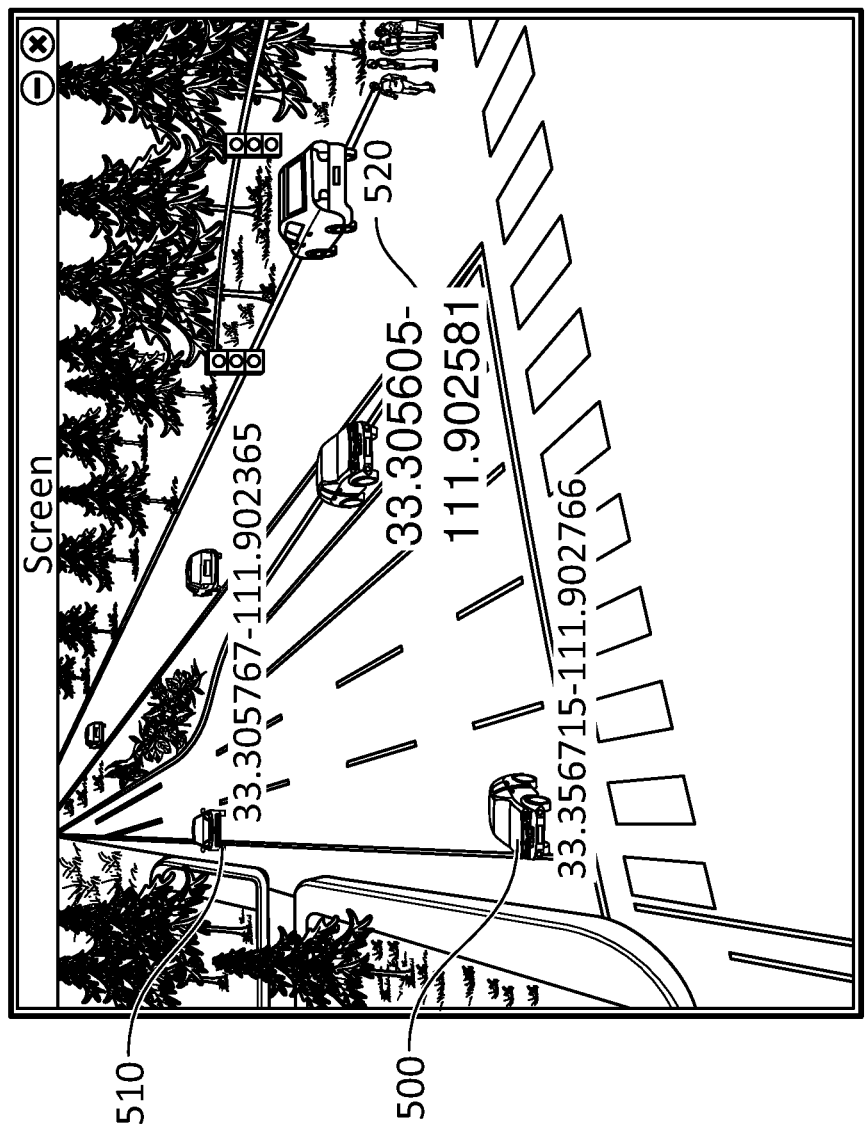
FIG. 5 illustrates an example 2D thermal camera image overlaid with GPS coordinate information, in accordance with one or more embodiments.

The integrated GPS receiver in the camera platform provides the information of the camera location in the real world. The gyro-compass provides the orientation of the camera, so the system can determine the cardinal direction. By combining this information with the 3D stage model, the system can translate the relative location of each object to real world GPS coordinates. An example of the GPS coordinates of detected objects overlaid on a 2D thermal camera image is shown in FIG. 5. As illustrated, objects such as vehicles are identified and tracked, and the GPS coordinates of each vehicle, such a GPS coordinates 500 of a first vehicle, GPS coordinates 510 of a second vehicle, and GPS coordinates 520 of a third vehicle.

Figure 6:
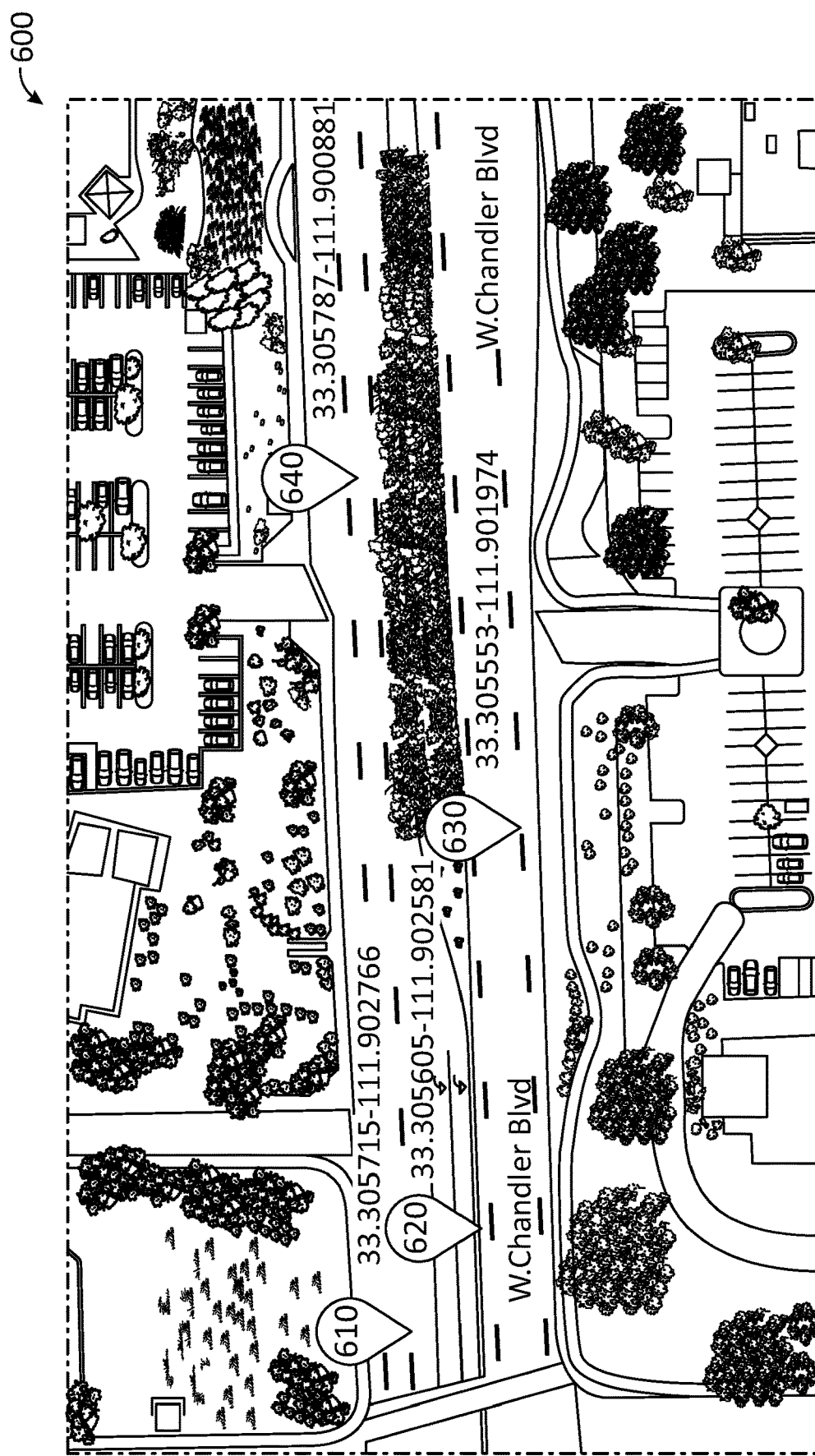
FIG. 6 illustrates an example real world map displaying GPS coordinates of tracked objects, in accordance with one or more embodiments.

The GPS coordinates of tracked objects can also be visualized on a real world map (e.g., a satellite image), such as real-world map 600 of FIG. 6, which illustrates a first object 610, a second object 620, a third object 630 and a fourth object 640. Each of the objects 610-640 is tracked and a current GPS position is displayed on a real-world map, such as a satellite image, along with corresponding GPS coordinates for each object.

Figure 7:
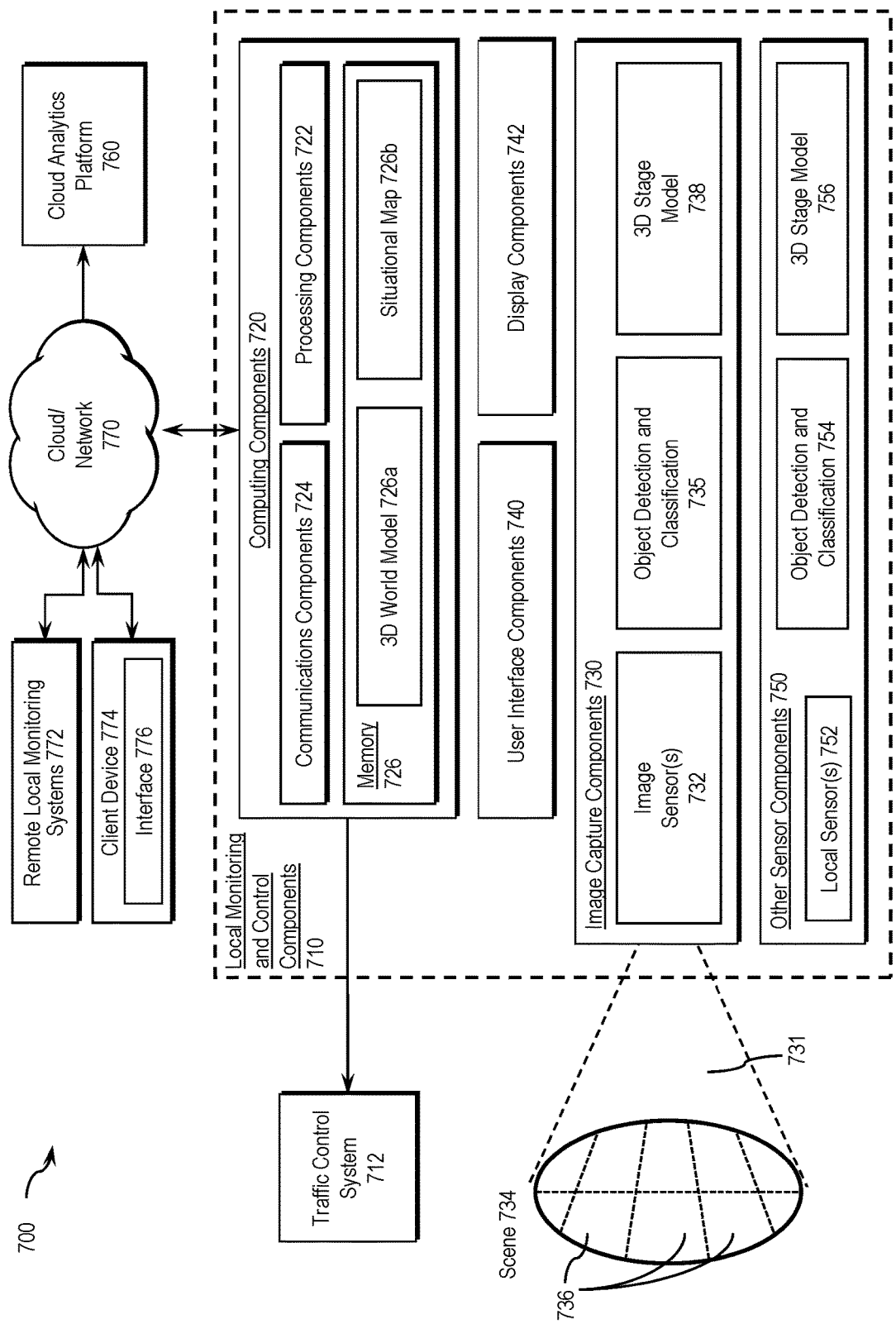
FIG. 7 illustrates an example intelligent transportation system, in accordance with one or more embodiments.

Referring to FIG. 7, an example intelligent transportation system implementing various aspects of the present disclosure will now be described in accordance with one or more embodiments. In some embodiments, an intelligent transportation system (ITS) 700 includes local monitoring and control components 710 for monitoring a traffic region and/or controlling a traffic control system 712 associated with the traffic region (e.g., a system for controlling a traffic light at an intersection). The local monitoring and control components 710 may be implemented in one or more devices associated with a monitored traffic area, and may include various processing and sensing components, including computing components 720, image capture components 730, user interface components 740, display components 742, and/or other sensor components 750.

The image capture components 730 are configured to capture images of a field of view 731 of a traffic location (e.g., scene 734 depicting a monitored traffic region). The image capture components 730 may be configured for infrared imaging (e.g., thermal imaging), visible spectrum imaging, and/or other imaging. In some embodiments, the image capture components 730 include object detection and classification components 735 configured to process captured images in real-time to detect and classify desired objects such as vehicles, bicycles, pedestrians and/or other objects. In some embodiments, the image capture components 730 can be configured through a web browser interface and/or software which is installed on a client device (e.g., remote client device 774 with interface 776 and/or another system communicably coupled to the image capture components 730). The configuration may include defined detection zones 736 within the scene 734 and system parameters.

When an object passes into a detection zone 736, the image capture components 730 detect and classify the object. In a traffic monitoring system, the system may be configured to determine if an object is a pedestrian, bicycle or vehicle. If the object is a vehicle or other object of interest, further analysis may be performed on the object to determine a further classification of the object (e.g., vehicle type) based on shape, height, width, thermal properties and/or other detected characteristics.

In various embodiments, the image capture components 730 include one or more image sensors 732, which may include visible light, infrared, and/or other imaging sensors. The object detection and classification module 735 detects, tracks and classifies objects that appear in the captured images, and defines a bounding box around a detected object's location in the image. In some embodiments, the object detection and classification object module 735 includes a trained neural network configured to output an identification of detected objects and associated bounding boxes, a classification for each detected object, and a confidence level for classification. The 3D stage model 738 transforms the image coordinates of each bounding box to real-world coordinates, such as coordinates from the point-of-view of the image capture components 730. In some embodiments, the image capture components include multiple cameras (e.g., a visible light camera and a thermal imaging camera) and corresponding object localization and coordinate transform modules.

In various embodiments, the local monitoring and control components 710 further include other sensor components 750, which may include feedback from other types of traffic sensors (e.g., radar system, a roadway loop sensor) and/or object sensors, which may include wireless systems, sonar systems, LiDAR systems, and/or other sensors and sensor systems. The other sensor components 750 include local sensors 752 for sensing traffic-related phenomena and generating associated data, and associated object detection and classification modules 754, which may include a neural network configured to detect and track objects in the sensor data and output object location and/or classification information (e.g., a bounding box around a detected object), and a 3D stage model 738 to transform the sensor data location to real-world coordinates associated with the image capture device or other coordinate system associated with the local monitoring control components.

In some embodiments, the various sensor systems 730 and 750 are communicably coupled to the computing components 720 and/or the traffic control system 712 (such as an intersection controller). The computing components 720 are configured to provide additional processing and facilitate communications between various components of the intelligent transportation system 700. The computing components 720 may include processing components 722, communication components 724 and a memory 726, which may include program instructions for execution by the processing components 722. For example, the computing components 720 may be configured to process data received from the image capture components 730 and other sensing components 750. The computing components 720 may be configured to communicate with a cloud analytics platform 760 or another networked server or system (e.g., remote local monitoring systems 772) to transmit local data for further processing. The computing components 720 may be further configured to receive processed traffic data associated with the scene 734, traffic control system 712, and/or other traffic control systems and local monitoring systems in the region. The computing components 720 may be further configured to generate and/or receive traffic control signals for controlling the traffic control system 712.

In various embodiments, the memory 726 stores program instructions to cause the processing components 722 to perform the processes disclosed herein. For example, the memory 726 may include instructions to facilitate (i) a 3D world model 726a and (ii) a situational map 726b, which are configured to track detected objects through the real-world space. The 3D world model 726a may include a distance matching module configured to match sensed objects from one or more sensors with tracked object data and/or identify a new object to track, prediction and occlusion modules configured to predict the location of tracked objects, including objects occluded from detection by a sensor, and a 3D world model configured to define a 3D bounding box or other 3D description of each object and track the object GPS coordinates in the real world space. The situational map 726b converts data from the 3D world model 726a for a desired use, such as mapping the object locations onto a top-down satellite image including all or part of the traffic scene 734 along with associated information (e.g., object size, object type, GPS coordinates, etc.).

The computing components 720 and other local monitoring and control components 710 may be configured to combine local detection of pedestrians, cyclists, vehicles and other objects for input to the traffic control system 712 with data collection that can be sent in real-time to a remote processing system (e.g., the cloud 770) for analysis and integration into larger system operations. In some embodiments, the local monitoring and control components 710 include user interface components (e.g., keyboard, pointing interface, graphical user interface, touch screen device) and display components 742 (e.g., a display screen, display of a touch screen device), allowing user access to traffic information, object data, situational maps, configuration interfaces, and other features of the intelligent transportation system 700. In some embodiments, the user interface components 740, display components 742 and associated applications (e.g., 3D world model 726a and/or situational map 726b) may reside on a separate device, such as portable computing device, smart phone, laptop computer, or other device communicably coupled (e.g., wired, optical, wireless or other communication coupling) or remote system, such as remote client device 774.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein. Embodiments described above illustrate but do not limit the invention. It should also be understood that numerous modifications and variations are possible in accordance with the principles of the invention. Accordingly, the scope of the invention is defined only by the following claims.

What is claimed:

1. A system comprising:
an image sensor configured to capture a stream of two-dimensional images of a scene from an associated real-world position;
an object tracker configured to identify an object in the captured two-dimensional images and define an associated object location in the captured two-dimensional images;
a three-dimensional stage model system configured to transform the associated object location in the two-dimensional images to three-dimensional coordinates associated with the image sensor; and
a three-dimensional world model configured to transform the three-dimensional coordinates of the identified objects to real-world coordinates.

2. The system of claim 1, wherein the image sensor comprises a visible light sensor configured to generate a stream of visible light images of the scene and/or a thermal image sensor configured to generate a stream of thermal images of the scene.

3. The system of claim 1, wherein the image sensor captures the stream of two-dimensional images through a lens having an aberration factor, and wherein the three-dimensional stage model is configured to transform the associated object location in the two-dimensional images to three-dimensional coordinates associated with the images based, at least in part, on the aberration factor to compensate for lens aberration.

4. The system of claim 1, wherein the object tracker is further configured to classify the identified objects.

5. The system of claim 1, wherein the object tracker comprises a neural network configured to receive captured two-dimensional image data and output an object classification, confidence factor, and/or object location in a corresponding captured two-dimensional image.

6. The system of claim 1, wherein the three-dimensional stage model system is configured to transform the associated object location in the two-dimensional images to three-dimensional coordinates associated with the image sensor by using data from an accelerometer and/or image sensor mounting height.

7. The system of claim 1, wherein the three-dimensional world model configured to transform the three-dimensional coordinates of the identified objects to real-world coordinates based, at least in part, on data received from a gyro-compass and/or a global positioning satellite receiver.

8. The system of claim 1, further comprising a situational mapping system configured to receive three-dimensional world model data and generate a situational map.

9. The system of claim 8, wherein the system is incorporated in a traffic monitoring system; and
wherein the object tracker is configured to identify vehicles in the captured images and monitor traffic.

10. The system of claim 8, wherein the situational map comprises a real-time traffic situational map and/or a configuration map configured to provide a user interface for configuration of one or more parameters of the system.

11. A method of operating a traffic monitoring system comprising:
capturing a stream of two-dimensional images of a scene from an associated real-world position of an image sensor;
identifying one or more objects in the captured two-dimensional images;
locating one or more objects in the captured two-dimensional images;
transforming an object location in the two-dimensional images to three-dimensional coordinates associated with the image sensor to generate a three-dimensional stage model; and
transforming the three-dimensional coordinates of the identified objects from the three-dimensional stage model to real-world coordinates in a three-dimensional world model.

12. The method of claim 11, wherein the image sensor comprises a visible light sensor configured to generate a stream of visible light images of the scene and/or a thermal image sensor configured to generate a stream of thermal images of the scene.

13. The method of claim 12, wherein identifying and/or classifying objects in the captured two-dimensional images comprises inputting captured two-dimensional image data to a trained neural network configured to output an object classification, confidence factor, and/or object location in a corresponding captured two-dimensional image.

14. The method of claim 11, wherein the image sensor captures the stream of two-dimensional images through a lens having an aberration factor, and wherein transforming an associated object location in the two-dimensional image to three-dimensional coordinates associated with the image sensor to generate a three-dimensional stage model further comprises compensating for lens aberration using the aberration factor.

15. The method of claim 11, further comprising classifying objects identified in the captured two-dimensional images.

16. The method of claim 11, wherein transforming an associated object location in the two-dimensional images to three-dimensional coordinates associated with the image sensor to generate a three-dimensional stage model is based, at least in part, on data from an accelerometer and/or image sensor mounting height.

17. The method of claim 11, wherein transforming the three-dimensional coordinates of the identified objects from the three-dimensional stage model to real-world coordinates in a three-dimensional world model is based, at least in part, on data received from a gyro-compass and/or a global positioning satellite receiver.

18. The method of claim 11, further comprising generating a situational map based, at least in part, on data from the three-dimensional world model.

19. The method of claim 18, wherein identifying one or more objects in the captured two-dimensional images further comprises identifying vehicles in the captured two-dimensional images; and monitoring traffic using the situational map.

20. The method of claim 18, wherein the situational map comprises a real-time traffic situational map and/or a configuration map configured to provide a user interface for configuration of one or more system parameters.

* * * * *